US009858130B2

(12) United States Patent
Grewal et al.

(10) Patent No.: US 9,858,130 B2
(45) Date of Patent: Jan. 2, 2018

(54) METHOD AND SYSTEM FOR DISTRIBUTED PROCESSING IN A MESSAGING PLATFORM

(71) Applicant: Twitter, Inc., San Francisco, CA (US)

(72) Inventors: Ajeet Grewal, San Francisco, CA (US); Siva Gurumurthy, San Francisco, CA (US); Venumadhav Satuluri, San Francisco, CA (US); Pankaj Gupta, San Francisco, CA (US); Brian Larson, San Francisco, CA (US); Volodymyr Zhabuik, San Francisco, CA (US); Aneesh Sharma, San Francisco, CA (US); Ashish Goel, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 418 days.

(21) Appl. No.: 14/498,787

(22) Filed: Sep. 26, 2014

(65) Prior Publication Data

US 2015/0089514 A1 Mar. 26, 2015

Related U.S. Application Data

(60) Provisional application No. 61/883,105, filed on Sep. 26, 2013.

(51) Int. Cl.
G06F 9/46 (2006.01)
G06F 9/54 (2006.01)
G06F 17/30 (2006.01)

(52) U.S. Cl.
CPC ............ *G06F 9/546* (2013.01); *G06F 9/46* (2013.01); *G06F 17/30424* (2013.01); *G06F 17/30958* (2013.01)

(58) Field of Classification Search
None
See application file for complete search history.

(56) References Cited

U.S. PATENT DOCUMENTS

2004/0044979 A1* 3/2004 Aji ..................... G06F 17/5077
716/113
2004/0230764 A1 11/2004 Merchant et al.
(Continued)

FOREIGN PATENT DOCUMENTS

WO 2013009503 A2 1/2013

OTHER PUBLICATIONS

International Search Report issued in corresponding International Application No. PCT/US2014/057847 dated Dec. 11, 2014 (5 pages).

(Continued)

*Primary Examiner* — Lewis A Bullock, Jr.
*Assistant Examiner* — Melissa Alfred
(74) *Attorney, Agent, or Firm* — Fish & Richardson P.C.

(57) ABSTRACT

A method for distributed processing involves receiving a graph (G) of targets and of influencers, with each influencer related to at least one target, receiving an action graph of actions performed by one or more of the influencers, and key partitioning G across shards. The method further involves transposing the first graph (G) to obtain a first transposed graph ($G^T$), valuing partitioning $G^T$ across the shards, storing the action graph on multiple shards, issuing, to a shard, a request specifying an influencer, to perform an intersection, receiving a response to the request of a set of influencers each of which is related to a target, and determining whether to send a recommendation to the target based on the response.

24 Claims, 10 Drawing Sheets

FIG. 4

(56) References Cited

U.S. PATENT DOCUMENTS

2012/0188249 A1    7/2012   Kretz et al.
2014/0280143 A1*   9/2014   Milenova .......... G06F 17/30705
                                                                  707/737
2015/0006316 A1*   1/2015   Zhou .................... G06Q 10/04
                                                                  705/26.7

OTHER PUBLICATIONS

Rohloff, Kurt, and Richard E. Schantz. "Clause-iteration with MapReduce to Scalably Query Datagraphs in the SHARD Graph-store." Data-Intensive Distributed Computing, ACM (Jun. 8, 2011): pp. 35-44, XP058003804, DOI: 10.1145/1996014.1996021 ISBN: 978-1-4503-0704-8 (10 pages).
Written Opinion issued in corresponding International Application No. PCT/US2014/057847 dated Dec. 11, 2014 (7 pages).

* cited by examiner

METHOD AND SYSTEM FOR DISTRIBUTED PROCESSING IN A MESSAGING PLATFORM

CROSS-REFERENCE TO RELATED APPLICATIONS

This application is a non-provisional patent application of U.S. Provisional Patent Application Ser. No. 61/883,105, filed on Sep. 26, 2013, and entitled: "Recommendations from a Messaging Platform." Accordingly, this non-provisional patent application claims priority to U.S. Provisional Patent Application Ser. No. 61/883,105 under 35 U.S.C. §119(e). U.S. Provisional Patent Application Ser. No. 61/883,105 is hereby incorporated by reference in its entirety.

COPYRIGHT NOTICE

A portion of the disclosure of this patent document may contain material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

BACKGROUND

Messaging platforms, such as social and professional networking sites, provide a rich environment for users to connect and communicate with other users. Content generated and shared by users of these platforms often propagates rapidly to a wide audience of connections in the social graph. In this way, messaging platforms can enable content sharing and communication across a wide array of geographically distributed users using a variety of client devices.

SUMMARY

In general, in one aspect, the invention relates to a method for distributed processing. The method comprising: receiving a first graph (G) comprising a plurality of targets and a plurality of influencers, wherein each of the plurality of influencers is related to at least one of the plurality of targets; receiving an action graph comprising a plurality of actions performed by one or more of the plurality of influencers; key partitioning G across a plurality of physical shards, wherein the key partitioning of G results in at least a first key partitioned graph (K(G1)) on a first shard and a second key partitioned graph (K(G2)) on a second shard; transposing the first graph (G) to obtain a first transposed graph ($G^T$); valuing partitioning $G^T$ across the plurality of physical shards, wherein the value partitioning of GT results in at least a first value partitioned graph ($V(G1^T)$) on the first shard and a second value partitioned graph ($V(G2^T)$) on the second shard; storing the action graph on at least the first shard and the second shard; issuing, to the first shard, a first request to perform a first intersection, wherein the first request specifies an influencer of the plurality of influencers; receiving in a first response to the first request, wherein the first response comprises a set of influencers each of which is related to a first target; and determining whether to send a recommendation to the first target based on the first response.

In general, in one aspect, the invention relates to a system. The system comprises: a plurality of physical shards; and a cross partitioning engine including functionality to: receive a first graph (G) comprising a plurality of targets and a plurality of influencers, wherein each of the plurality of influencers is related to at least one of the plurality of targets; receive an action graph comprising a plurality of actions performed by one or more of the plurality of influencers; key partition G across a plurality of physical shards, wherein the key partitioning of G results in at least a first key partitioned graph (K(G1)) on a first shard and a second key partitioned graph (K(G2)) on a second shard; transpose the first graph (G) to obtain a first transposed graph ($G^T$); valuing partition GT across the plurality of physical shards, wherein the value partitioning of $G^T$ results in at least a first value partitioned graph ($V(G1^T)$) on the first shard and a second value partitioned graph ($V(G2^T)$) on the second shard; store the action graph on at least the first shard and the second shard; issue, to the first shard, a first request to perform a first intersection, wherein the first request specifies an influencer of the plurality of influencers; receive in a first response to the first request, wherein the first response comprises a set of influencers each of which is related to a first target; and determine whether to send a recommendation to the first target based on the first response.

In general, in one aspect, the invention relates to a non-transitory computer readable medium comprising computer readable program code. The computer readable program code, when executed by a computer processor, enables the computer processor to: receive a first graph (G) comprising a plurality of targets and a plurality of influencers, wherein each of the plurality of influencers is related to at least one of the plurality of targets; receive an action graph comprising a plurality of actions performed by one or more of the plurality of influencers; key partition G across a plurality of physical shards, wherein the key partitioning of G results in at least a first key partitioned graph (K(G1)) on a first shard and a second key partitioned graph (K(G2)) on a second shard; transpose the first graph (G) to obtain a first transposed graph ($G^T$); valuing partition $G^T$ across the plurality of physical shards, wherein the value partitioning of $G^T$ results in at least a first value partitioned graph ($V(G1^T)$) on the first shard and a second value partitioned graph ($V(G2^T)$) on the second shard; store the action graph on at least the first shard and the second shard; issue, to the first shard, a first request to perform a first request, wherein the first request specifies an influencer of the plurality of influencers; receive in a first response to the first intersection, wherein the first response comprises a set of influencers each of which is related to a first target; and determine whether to send a recommendation to the first target based on the first response.

In general, in one aspect, the invention relates to a non-transitory computer readable medium comprising computer readable program code. The computer readable program code to process requests using a graph (G1), when executed by a computer processor, enables the computer processor to: receive, from a broker, a request to perform an intersection, wherein the request specifies the influencer; in response to the request: perform, using the influencer as a key, a look-up in $V(G1^T)$ to obtain a first set of targets; perform, using a first target in the set of targets as a key, a look-up in K(G1) to obtain a first set of influencers for the first target; perform the intersection between the first set of influencers and the action graph to obtain a second set of influencers; provide, to the broker, a response to the request comprising the second set of influencers.

In general, in one aspect, the invention relates to a method for processing requests using a graph (G1). The method comprising: receiving, from a broker, a request to perform an intersection, wherein the request specifies the influencer; in response to the request: performing, using the influencer as a key, a look-up in $V(G1^T)$ to obtain a first set of targets; performing, using a first target in the set of targets as a key, a look-up in $K(G1)$ to obtain a first set of influencers for the first target; performing the intersection between the first set of influencers and the action graph to obtain a second set of influencers; providing, to the broker, a response to the request comprising the second set of influencers.

Other aspects of the invention will be apparent from the following description and the appended claims.

DETAILED DESCRIPTION

Figure 1A:
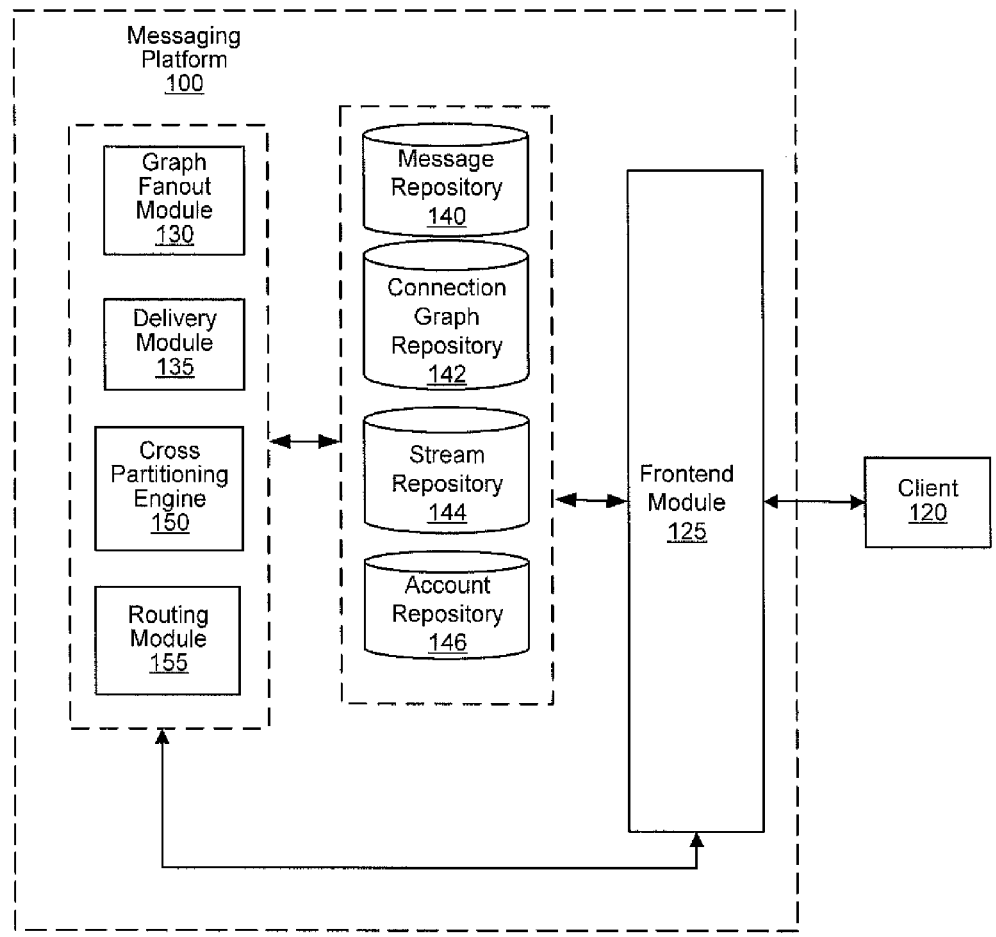
FIGS. 1A and 1B show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, system, and computer readable medium for distributed processing on a messaging platform. The distributing processing allows for the processing of queries in a near real time manner or in a timely manner (but not near real time), where the results of the queries are used, for example, to determine how individual users of the platform are connected and what types of recommendations to provide to a given user. Given the large number of users, i.e., greater than 200 million and the millions of actions collectively performed by the users every day, embodiments of the invention use a novel and non-obvious partitioning scheme to distribute the data associated with the users of the messaging platform across nodes. The partition scheme enables efficient processing of data by only placing a subset of the data on a given node and allowing the nodes to process data locally with no or minimal internode communication. Said another way, the data is partitioned in such a manner that a majority of, if not all, processing for a given request may be performed locally by the node and not require intermediate results from one node to then be processed by other nodes in order to obtain a final result. The lack or minimization of internode processing also results in an increase in performance (i.e., lowers the latency to process a query in order to determine one or more actions to take).

In one or more embodiment of the invention, certain data in the messaging platform may be including in the form of a graph or graphs. Generally, there are two primary types of graphs that are used to implement one or more embodiments of the invention. A first type of graph includes connectivity between the users (i.e., reflect that there is some relationship between the users) (see e.g., FIG. 2A). The criterion/criteria used to determine that two users are connected and how they are connected (such as unidirectionally or bi-directionally) may vary without departing from the invention. The second type of graph relates user(s) to actions performed by the user(s). The particular action or action(s) tracked by the second type of graph may vary without departing from the invention.

In order to achieve the necessary performance to process the data in the messaging platform, the data to be processed is typically stored in memory to permit in-memory processing. Unfortunately, due to the size of the graphs that are to be processed, it is impractical or even impossible for a single computer to have sufficient memory or processing power to perform calculations on the graphs. For example, during typical operation of the messaging platform, approximately 200 million actions may be performed each day. If each action requires approximately 32 bytes of memory, then each day approximately 6.4 GB of new data is generated. This newly generated data only relates to actions that are being performed on the messaging platform (i.e., data in the second type of graph discussed above) and does not include the data related to the first type of graph discussed above (which itself is significant and also requires a significant amount of data storage). Further, with respect to the processing power issue, if the messaging platform has 200 million accounts, and one hundred computers are processing actions in parallel with each of the computers able to perform 10,000 queries per second, it would take approximately five hours to query each user on the messaging platform once. Given that results from queries executed on the messaging platform are required to be processed in the minute(s) time scale versus the hour time scale, embodiments of the invention create and distribute partitioned graphs, which may then be processed more efficiently.

More specifically, the graphs are distributed across multiple nodes, where each node is located on a shard. The node may locally perform various operations on the data stored in the node. The local results may then be combined and then used to determine an appropriate course of action (see FIGS. 4 and 5A-5B below).

In general, throughout this specification a method, system, and computer readable medium for distributed processing of data, where the results may then be used to determine one or more actions to perform (e.g., generate recommendations). Of particular interest, is the speed at which the results from the distributed processing may be provided, and the size of the data set from which the processing of the results is performed. When working with extremely large data sets, it is often impractical, if not impossible, for a single computer to perform all of the necessary calculations and actions. Thus, there is a need to split up the data across multiple nodes (described below). Additionally, in messaging platforms speed is very important—a recommendation provided 10 minutes after the action occurred (such as a recommendation to view an important announcement) may be highly relevant to a user while the same recommendation provided 5 hours after the action occurred is of no interest.

As shown in FIG. 1A, the messaging platform (100) has multiple components including a cross partitioning engine (150), a frontend module (125), a routing module (155), a graph fanout module (130), a delivery module (135), a message repository (140), a connection graph repository (142), a stream repository (144), and an account repository (146). Various components of the messaging platform (100) may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g., a local area network (LAN), the Internet, etc.). Those skilled in the art will appreciate that there may be more than one of each separate component running on a device, as well as any combination of these components within a given embodiment of the invention.

In one or more embodiments of the invention, the messaging platform (100) is a platform for facilitating real-time (or near real-time) communication between one or more entities. For example, the messaging platform (100) may store millions of accounts of individuals, businesses, and/or other entities (e.g., pseudonym accounts, novelty accounts, etc.). One or more users of each account may use the messaging platform (100) to send social networking messages to other accounts inside and/or outside of the messaging platform (100). The messaging platform (100) may be configured to enable users to communicate in "real-time", i.e., to converse with other users with a minimal delay and to conduct a conversation with one or more other users during simultaneous sessions. In other words, the messaging platform (100) may allow a user to broadcast social networking messages and may display the social networking messages to one or more other users within a reasonable time frame so as to facilitate a live conversation between the users. Recipients of a social networking message may have a predefined graph relationship with an account of the user broadcasting the social networking message. In one or more embodiments of the invention, the user is not an account holder or is not logged in to an account of the messaging platform (100). In this case, the messaging platform (100) may be configured to allow the user to broadcast social networking messages and/or to utilize other functionality of the messaging platform (100) by associating the user with a temporary account or identifier.

Figure 2A:
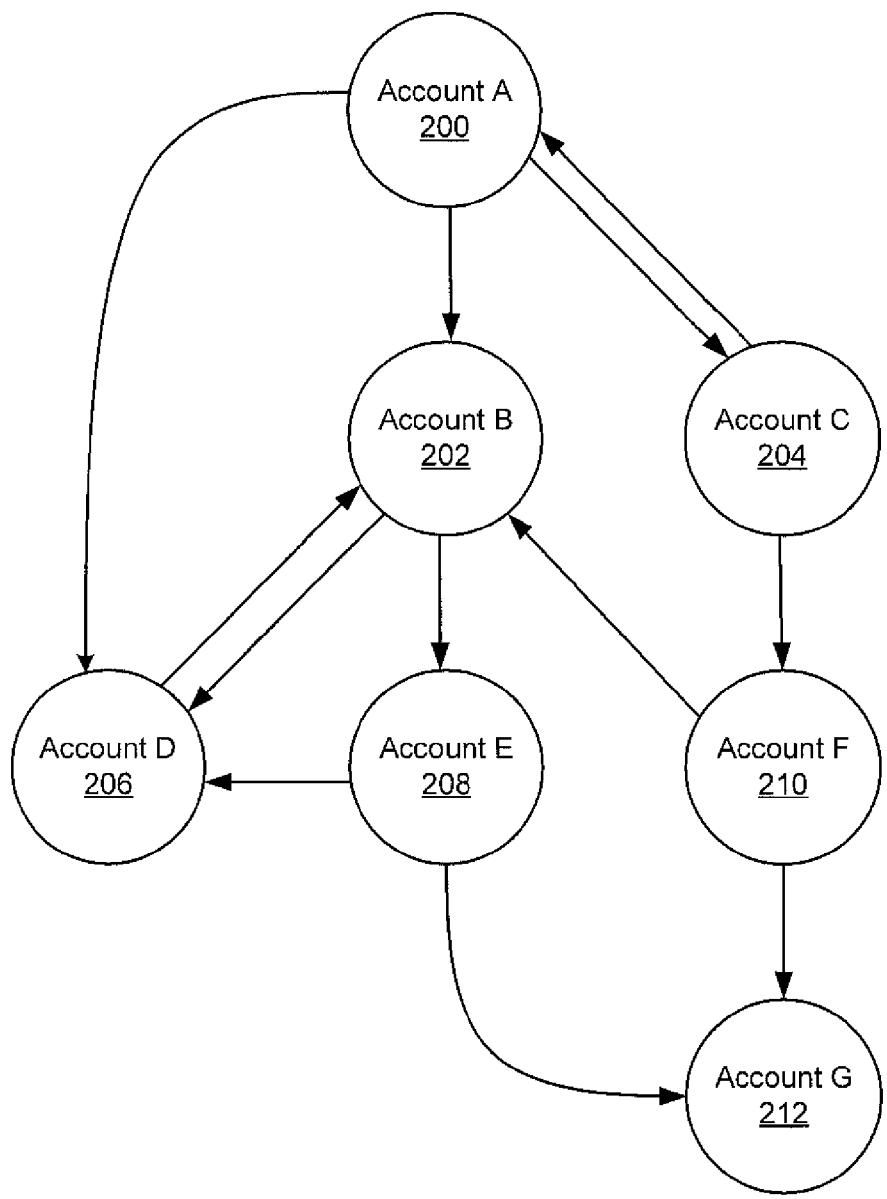
FIG. 2A shows a depiction of a connection graph in accordance with one or more embodiments of the invention.

In one or more embodiments of the invention, the connection graph repository (142) is configured to store one or more connection graphs. FIG. 2A shows an example depiction of a connection graph G (298) in accordance with one or more embodiments of the invention. As shown in FIG. 2A, the G (298) has multiple components including nodes representing accounts of the messaging platform (100) (i.e., Account A (200), Account B (202), Account C (204), Account D (206), Account E (208), Account F (210), Account G (212)) and edges connecting the various nodes.

The G (298) is a data structure representing relationships (i.e., connections) between one or more accounts. The G (298) represents accounts as nodes and relationships as edges connecting one or more nodes. A relationship may refer to any association between the accounts (e.g., following, friending, subscribing, tracking, liking, tagging, retweeting, favorites, direct messages sent, profile views, or any other relationship). The edges of G (298) may be directed and/or undirected based on the type of relationship (e.g., bidirectional, unidirectional), in accordance with various embodiments of the invention.

Figure 2B:
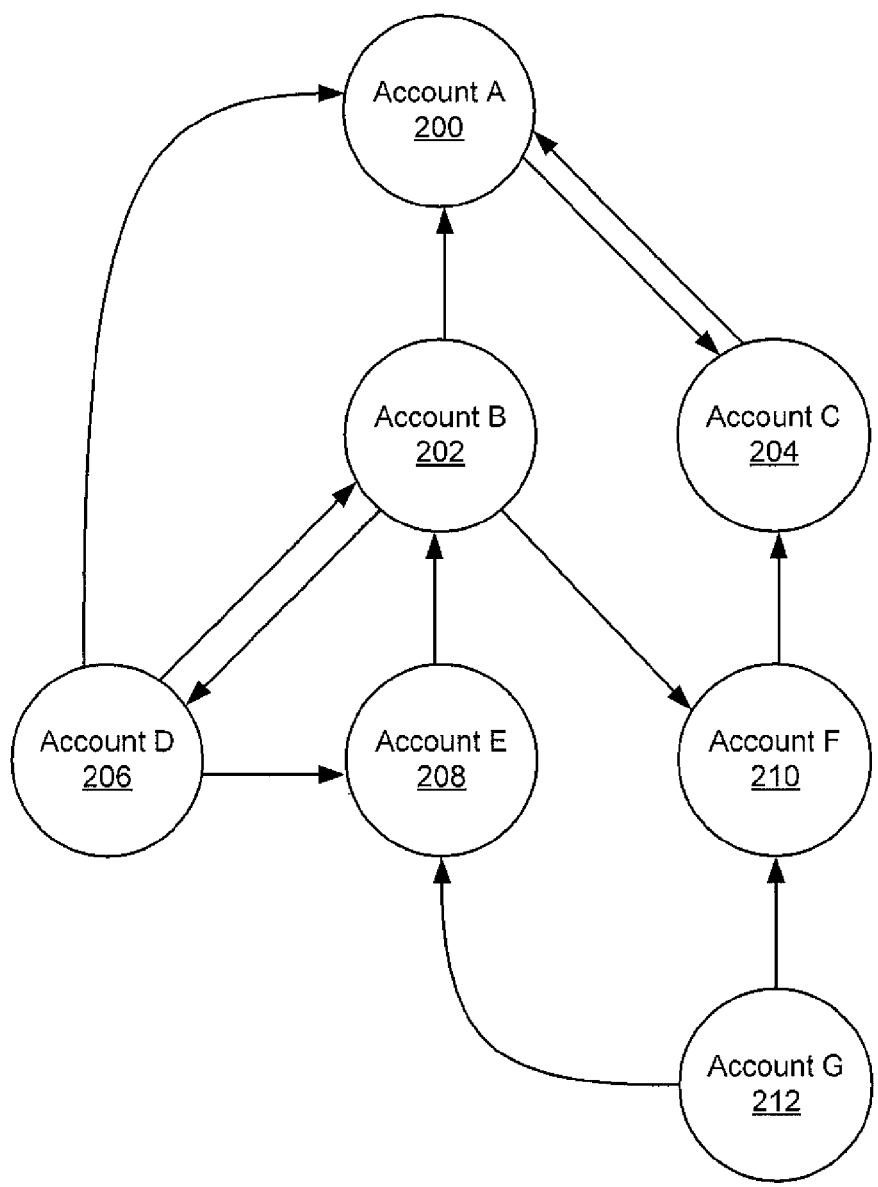
FIG. 2B shows a depiction of a transpose of the connection graph of FIG. 2A.

Other representations of a connection graph may also be used in various embodiments of the invention. For example, a transpose of a graph may be created. A transpose of the connection graph shown in FIG. 2A is shown in FIG. 2B. Specifically, $G^T$ (299) is shown. As with G (298) of FIG. 2A, the same accounts are shown in $G^T$ (299). However, the relationships between the nodes of $G^T$ (299) have been transposed. Thus, the relationship that flowed from Account B (202) to Account E (208) of G (298) in FIG. 2A, now flow from Account E (208) to Account B (202) in $G^T$ (299).

In one or more embodiments of the invention, the connection graph repository (142) may also store information about actions performed by user. Specifically, the connection graph repository may relate user identifiers of a user to user's preferences and history in the messaging platform (100). For example, the user preferences and history may include language, connections of the user, topics in which the user is interested and other information. Additionally, connection graph repository (142) may store other kinds of graphs, such as an action graph of all actions performed by each user (or users) within the social network. The action graph may be updated in real time, and maybe only store actions performed in the past 30 minutes, hour, day, two days, or others suitable time unit.

In one or more embodiments of the invention, the routing module (155) includes functionality to receive one or more social networking messages and to store the social networking messages in the message repository (140). The routing module (155) may include functionality to assign an identifier to the social networking message and to notify the graph fanout module (130) of a sender of the social networking message.

In one or more embodiments of the invention, the graph fanout module (130) includes functionality to retrieve graph data from the connection graph repository (142) and to use the graph data to determine which accounts in the messaging platform (100) should receive the social networking message. The graph data, for example, may reflect which accounts in the messaging platform are "following" a particular account and are, therefore, subscribed to receive status social networking messages from the particular account.

In one or more embodiments of the invention, the delivery module (135) includes functionality to receive a list of accounts from the graph fanout module (130) and the message identifier generated by the routing module (155) and to insert the message identifier into stream data associated with each identified account. The delivery module (135) may then store the message list in the stream repository (144). The stream data stored in the stream repository (144) may make up one or more streams associated with one or more accounts of the messaging platform (100). A stream may be a dynamic list of social networking messages associated with one or more accounts or may reflect any arbitrary organization of social networking messages that is advantageous for the user of an account.

In one or more embodiments of the invention, the frontend module (125) is a software application or a set of related software applications configured to communicate with external entities (e.g., client (120)). The frontend module (125) may include the application programming interface (API) and/or any number of other components used for communicating with entities outside of the messaging platform (100). The API may include any number of specifications for making requests from and/or providing data to the messaging platform (100). For example, a function provided by the API may provide artist/song recommendations to a requesting client (105).

In one or more embodiments of the invention, the frontend module (125) is configured to use one or more of the data repositories (message repository (140), connection graph repository (142), stream repository (144), and/or account repository (145)) to define streams for serving social networking messages (i.e., stream data) to a user of the account on the messaging platform (100). A user may use any client (120) to receive the social networking messages. For example, where the user uses a web-based client to access the messaging platform (100), an API of the frontend module (125) may be utilized to define one or more streams and/or to serve the stream data to the client for presentation to the user. Similarly, different forms of message delivery may be handled by different modules in the frontend module (125). In one or more embodiments of the invention, the user may specify particular receipt preferences, which are implemented by the frontend module (125).

In one or more embodiments of the invention, one or more of the data repositories (message repository (140), connection graph repository (142), stream repository (144), account repository (146)) is a database and/or storage service residing on one or more servers. For example, one or more of the data repositories may be implemented as a storage service using service-oriented architecture (SOA) and configured to receive requests for data and to provide requested data to other components of the messaging platform (100). In another example, the message repository (140) may include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application may be used, in accordance with various embodiments of the invention.

In one or more embodiments of the invention, one or more of the data repositories (message repository (140), connection graph repository (142), stream repository (144), account repository (146)) is a separate application or set of applications residing on one or more servers external (and communicatively coupled) to the messaging platform (100). Alternatively, in one or more embodiments of the invention, one or more of the data repositories may be an integrated component of the messaging platform (100) and/or may reside, either partially or entirely, on one or more common hardware devices (e.g., a server).

In one or more embodiments of the invention, the message repository (140) includes functionality to store social networking messages and social networking messages metadata. The social networking messages metadata may include an identifier of the originating user of the social networking message, a list of users that received the social networking message, a number of users that received the social networking message, statistics (e.g., a ratio of connected users to the originating user that forward the social networking message versus disconnected users to the originating user that forward the social networking message), time and date in which the social networking message is transmitted, and other information.

In one or more embodiments of the invention, cross partitioning engine (150) includes functionality for receiving graphs, distributing graphs across nodes, issuing queries to one or more nodes (see FIG. 4), receiving in certain scenarios some intermediate results and issuing subsequent queries based on the intermediate results (see discussion related to FIGS. 5A and 5B), and combining results received from individual nodes (see discussion related to FIGS. 5A and 5B), and sending recommendations (or performing other actions) based on the results. Cross partitioning engine (150) may execute on one or more processors spread across multiple shards. Cross partitioning engine (150) may receive graphs from any suitable component of messaging platform (100), such as connection graph repository (142), or any other component. The graphs may be received in any manner now known or later developed.

In one or more embodiments of the invention, cross partitioning engine (150) includes functionality for distributing the received graphs to a particular shard or to a particular node on a shard if the shard is partitioned. In one embodiment of the invention, each shard may be a separate partition of a hard drive(s), or separate computing devices, a combination thereof, or any other suitable setup. The received graphs may be partitioned and the resulting partitions may be distributed over any number of shards using a variety of methods. In one or more embodiments of the invention, the received graphs are distributed using a hash function. Alternatively, any other function or formula may be used. Further, any number partitioned graphs may be stored on a given shard. In one or more embodiments of the invention, the cross partitioning engine (150) includes functionality for tracking where each partitioned graph is stored (i.e., on which specific worker shard) in any manner now known or later developed.

In one embodiment of the invention, a given graph may be partitioned using key partitioning or value partitioning. Consider an edge in a graph (u→v). For key partitioning, a hash function (H) is applied to u in order to generate a hash result (i.e., H (u)). The hash result is then used to distribute the edge to an appropriate shard or node. For example, if there are n possible nodes then a node may be selected as follows: H (u) mod n. Similarly, for value partitioning, a hash function (H) is applied to v in order to generate a hash result (i.e., H (v)). The hash result is then used to distribute the edge to an appropriate shard or node. For example, if there are n possible nodes then a node may be selected as follows: H (v) mod n.

In one or more embodiments of the invention, cross partitioning engine (150) partitions the received graphs based on a specific user(s) using key and/or valuing partitioning. For example, the partitioned graph may include edges that show specific user(s) and the influencer(s) of the specific user(s). Said another way, if user A follows B, C, D, then B, C, D may be influencers of A and the partitioned graph may include A→[B, C, D], where the partitioning is performed using key partitioning. The same node that stores A→[B, C, D] may also store a partition of a transpose of the received graph. A transpose is a reflection of a graph. In other words, if the partitioned graph includes edge A→B, then the transpose of the edge is B→A.

Figure 2C:
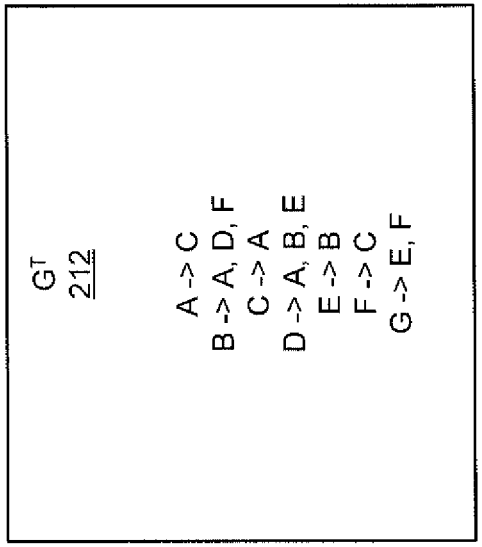
FIG. 2C shows a depiction of the graph shown in FIG. 2A and the graph shown in FIG. 2B in accordance with one or more embodiments of the invention.
Figure 2C:
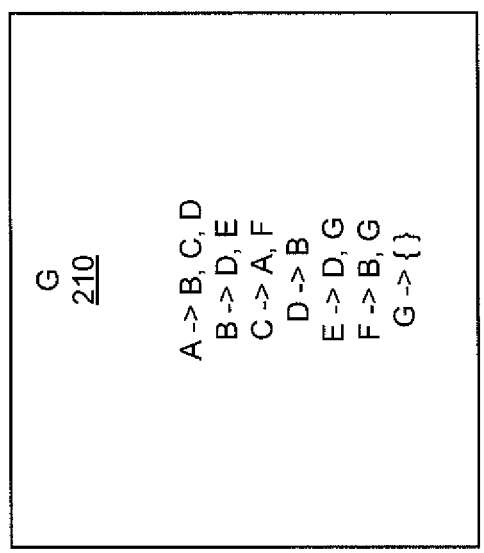

Turning to FIGS. 2A-2C, an example of graphs and transposed graphs is further explained. Specifically, FIG. 2C depicts the edges (220) of Graph (G) (298) in FIG. 2A and the edges (222) of $G^T$ (299) of FIG. 2B. Specifically, Value (G) (250) depicts the relationships of G (298) of FIG. 2A organized by value. FIG. 2A shows an example of a connection graph that shows the relationships between users. In this example, an edge u→v indicates that user u follows user v. Said another way, user v is an influencer of user u. FIG. 2B shows the transpose of the graph shown in FIG. 2A.

With respect to FIG. 2A, it can be seen that account E (208) follows account D (206) and account G (212). This is depicted "E→D, G" in FIG. 2C. Referring to FIG. 2B, the direction of the connections is the direction of influence. For example, in FIG. 2B, there is an edge between user D (206) and user E (208). This relationship is shown in FIG. 2C, as edge D→E, which indicates that D is an influencer of E.

Returning to FIG. 1A, cross partitioning engine (150) distributes partitioned graphs across the nodes using a hash function (or any other function that may be used to distribute partitioned graphs across nodes). The use of a hash function provides a deterministic mechanism so that given the hash function and the type of partitioning (e.g., key or value), the node with the appropriate portioned graphs may be located.

In one embodiment of the invention, for a connection graph (G), each node n may include one or more of the following partitioned graphs: (i) Key partitioned graph of G (denoted K(G)), (ii) value partitioned graph of G (denoted V(G)), (iii) Key partitioned graph of $G^T$ (transpose of G) (denoted K($G^T$)), (iv) value partitioned graph of $G^T$ (denoted V($G^T$)). The specific combination of the aforementioned graphs that are located on any given node may vary based on the types of processing that is being performed on the shards/nodes (see examples below).

In addition to the above partitioned connection graphs, each node may include other non-partitioned graphs such as a graph of events performed by a subset of users (e.g., influencers in a preceding time period) (e.g., a list of which of the top 200 users in the messaging platform retransmitted (e.g., retweeted) a given message in the last 24 hours). The nodes may also include other graphs without departing from the invention.

Continuing with FIG. 1A, cross partitioning engine (150) includes functionality to perform one or more of the queries described with respect to FIG. 5A and FIG. 5B below. In one or more embodiments of the invention, a majority of the processing of each of the queries is performed locally on node as in many cases all of the data that is need to perform the query is present on the node. Thus, for example, the work of performing many intersections across many large graphs is broken down into manageable sizes and parallelized, to minimize the processing cost and time.

In one or more embodiments of the invention, based on the intersection(s), and a variety of other factors, the cross partitioning engine (150) includes functionality to send the recommendation(s) to the target. The recommendation(s) may be anything, from a user to follow, a message to read, or any other action. Any number of recommendation(s) may be sent. In one or more embodiments of the invention a recommendation is sent only when multiple influencers have performed the same action in a set time frame. The time frame may be any suitable amount, but may be a relatively recent timeframe, such as within 2 hours of the action occurring. It will be apparent to one of ordinary skill in the art that there are many ways and types of recommendations and, as such, the invention should not be limited to the above examples. Further, these aspects, and others, are discussed in more detail in FIG. 1B.

Figure 1B:
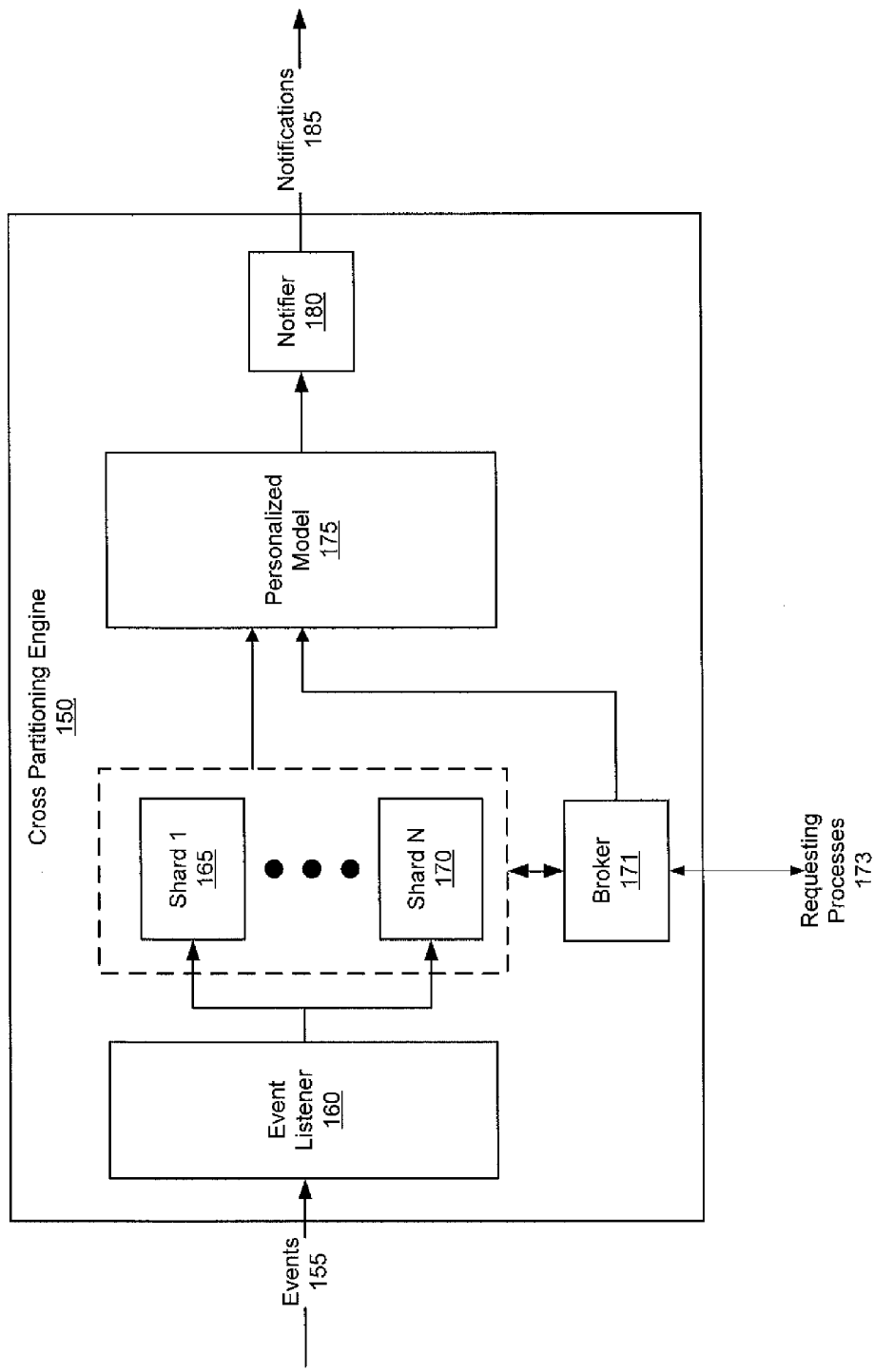

FIG. 1B shows a schematic diagram of a system in accordance with one or more embodiments of the invention. Specifically, FIG. 1B shows a more detailed diagram of the cross partitioning engine (150) in the messaging platform (100). In other words, the cross partitioning engine (150) in FIG. 1B is essentially the same as the cross partitioning engine (150) in FIG. 1A. Cross partitioning engine (150) includes an event listener(s) (160), shard 1 (165), shard N (170), a broker (171), a requesting process (173), a personalized model (175), and a notifier (180), and notifications (185). Events (155) are events that have occurred within messaging platform (100). Events (155) may be provided to cross partitioning engine (150) by some other component of messaging platform (100), and may form a constant stream of real-time actions. The events (155) may take any form now known or later developed. The events (155) may arrive filtered according to which user's graphs are stored on a given shard (i.e., shard 1 (165) and/or shard N (170)), or may arrive in a raw, unfiltered state. Events (155) may number in the tens of thousands per second, or more. Events (155) may include any action within the messaging platform (100) including, but not limited to: follows, favorites, clicking a link, sending a message, rebroadcasting, viewing a message, performing a search, user moving to a physical location of interest, etc.

In one or more embodiments of the invention, event listener (160) includes functionality to listen to all of the events (155) and distribute the events (155) to the shard and/or to every node on the shard. In one or more embodiments of the invention, event listener (160) merely passes on all the events to every shard or every node of the shard. Alternatively, event listener (160) is aware of which users are stored on which shard(s) (or which node on the shard), and only distributes events to their corresponding shards or nodes on the shard. In one embodiment of the invention, the event listener may use the same hash function that is used to key and value partition the graphs across the shards/nodes to also determine which shard or node to send the event.

In one or more embodiments of the invention, shard 1 (165) and shard N (170) are shards. The shards may be any type of computing device or devices, and may have any number of partitions within them. If a shard is partitioned, then each partition may be referred to as a node. Additionally, shard 1 (165) and shard N (170) may store any number of partitioned graphs and non-partitioned graphs (as discussed above), Shard 1 (165) and shard N (170) locally perform the intersections, as discussed above, and determine whether to send a recommendation to the user. The determination may be made, for example, only when multiple different influencers of a given user perform the same action within a set timeframe. Shard 1 (165) and shard N (170) may then pass the results to a personalized model (175) or to a broker (171).

In one or more embodiments of the invention, personalized model (175) takes the results from shard 1 (165) and shard N (170) and applies a personalized model to the generate one or more recommendations, ensuring that the recommendation should in fact be sent. The personalized model (175) may apply other data such as the user's cohort, user profile information, user age, user gender, user geo location, user follower count, last login time of the user, how long it has been since the user received a recommendation, whether the user is currently using the messaging platform, and/or many other elements. The application of the personalized model ensures that a recommendation is high quality and should be sent. If the personalized model (175) determines that the recommendation should, in fact, be sent, the recommendation is passed to the notifier (180).

In one embodiment of the broker (171) includes functionality to receive requests (see discussion of FIGS. 5A and 5B below) from one or more requesting processes (173) executing on the messaging platform and then issue one or more queries to service the requests to the shards (or nodes on the shard). The broker (171) subsequently receives the responses from shards (or nodes on the shard). Based on the response from the shards (or the nodes), the broker (171) may send a response back to the requesting process (173), send the data to the personalization model (175), and/or send a second set of queries to one or more shards (or nodes) using the intermediate results received by the broker (171). The broker (171) may also aggregate the responses received from the shards (or nodes) in order to generate an a result prior to sending a response transmitting the response to the requesting process (173) or the personalization module (175). The broker (171) may also analyze the responses received from the shards (or nodes) in order to generate an a result prior to sending a response transmitting the response to the requesting process (173) or the personalization module (175). The broker (171) may perform other types of processing on the responses received from the shards (or nodes) without departing from the invention.

In one or more embodiments of the invention, notifier (180) includes functionality to send the recommendation(s) to the user in the form of notifications (185). Notifications (185) may be sent to the target user in any manner and/or form now known or later developed. For example, notifications (185) may be a public message, a private message, an e-mail, a text message, a voice message, a video message, or any other suitable form.

In one embodiment of the invention, the cross-partitioning engine only includes the broker and any other component that is necessary to perform the initial partitioning of the graphs, to update the partitions of the graphs over time. All other components shown in FIG. 1B may be located external to the cross-partitioning engine (150).

Figure 3:
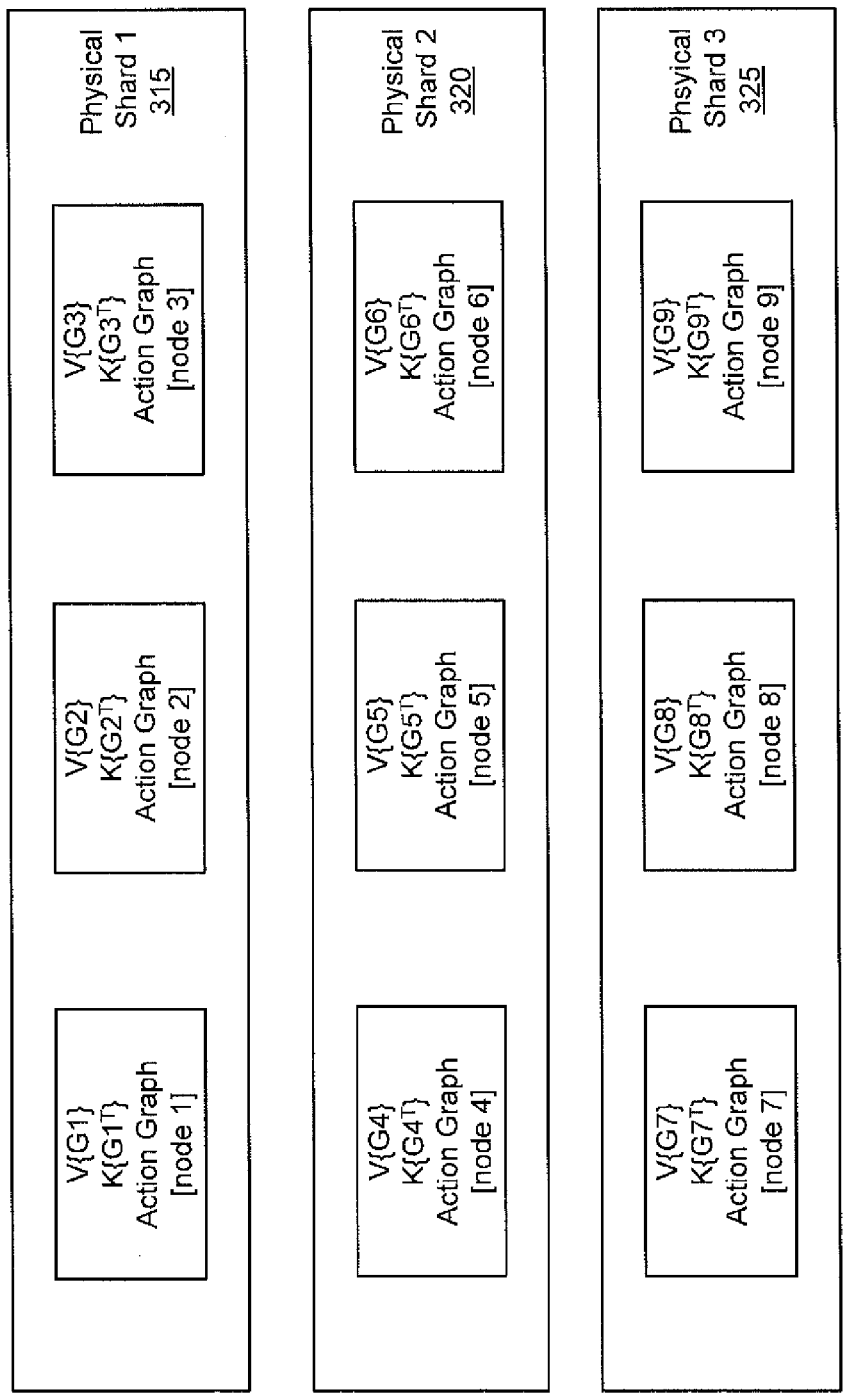
FIG. 3 shows a depiction of cross partitioning, in accordance with one or more embodiments of the invention.

FIG. 3 shows shards in accordance with one or more embodiments of the invention. As shown in FIG. 3, each of the shards represents a physical system that includes: (i) one or more processors (not shown); (ii) memory (not shown) that is sufficient to store the various partitioned and non-partitioned graphs (e.g., V{G1}, K{G1$^T$}, action graph, etc.); (iii) have one or more physical interfaces over which to receive queries from the broker (see FIG. 1B) and to send responses to the broker and/or the personalization model (see FIG. 1B). Further, the shards and/or nodes include functionality to process one or more queries described below (see discussion of FIGS. 5A and 5B). In one embodiment of the invention, this functionality may include non-transitory computer readable instructions, which when executed, enable the shard (or node) to perform the aforementioned functionality.

Figure 4:
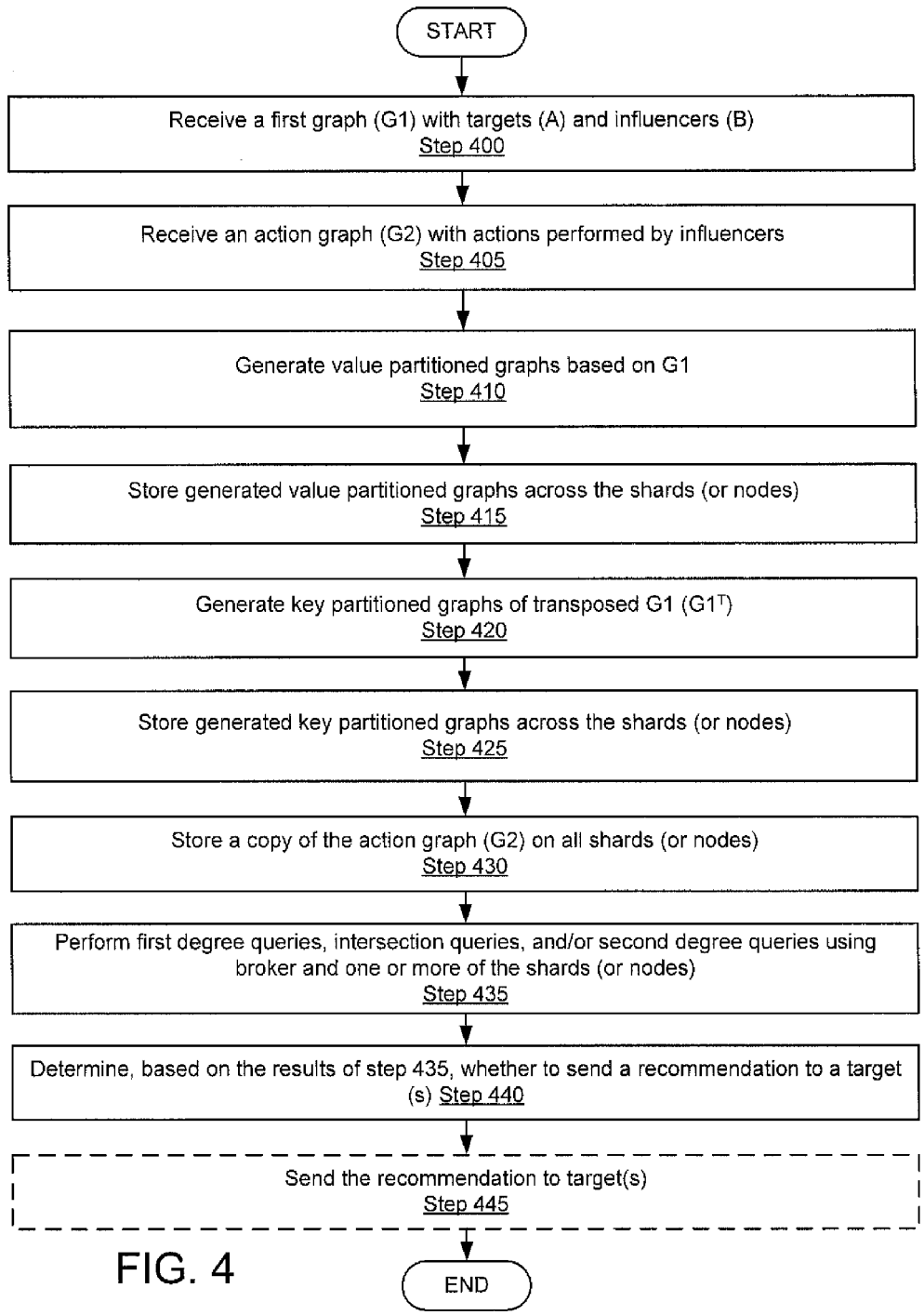
FIG. 4 shows a flowchart in accordance with one or more embodiments of the invention.

FIG. 4 shows a flowchart of a method, in accordance with various embodiments of the invention. While the various steps in the flowchart are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 4 should not be construed as limiting the scope of the invention.

In Step 400, a first graph (G1) with targets (A) and influencers (B) is received. The graph may be in any format and may be received in any manner now known or later developed. An individual user is a target when a recommendation is being generated for him/her. An influencer is a user with whom the target has a relationship. The relationship may be that the target follows the influencer. Alternatively, the relationship may be any other relationship. A given target may have any number of influencers, from 0 to thousands or more. In one or more embodiments, not all influencers of a target are included in the graph. Rather, a subset of the top/most important influencers may be used, such as the top 200. In one or more embodiments, within the messaging platform a given user may be both a target and an influencer. A example of a graph received in Step 400 is shown in FIG. 2A.

In Step 405, an action graph with actions performed by influencers is received. The action graph may be received in any format and in any manner now known or later developed. In one or more embodiments of the invention, the action graph includes all actions performed on a messaging platform within a time frame, such as the past 45 minutes, 3 hours, 2 days, etc. Alternatively, the action graph may only include actions performed by a subset of users of the messaging platform, such as the influencers that are present on a given shard or node on a shard. In one embodiment of the invention, the action graph may be a set of graphs of the form C←[$b_i$, $b_n$], where C corresponds to a given action and [$b_i$, $b_n$] corresponds to the set of users that have performed that action. Accordingly, in one embodiment of the invention, there may be one action graph per action. In one embodiment of the invention, the action may be defined very specifically (e.g., which users followed user X within the last 24 hours) or may be more general (e.g., which user retweeted a message (i.e., any message) on the messaging platform). The action may or may not be limited by time. Further, the action graph(s) may only include user of users in the message platform even though a larger number of users performed the action. For example, if 10,000 users performed an action only the top 200 user (based on some criterion/criteria) may be included in the action graph for the action.

In Step 410, value partitioned graphs of a first target and a group of influencers related to the first target is generated. The value partitioned graphs may be generated in any manner now known or later developed. The value partitioned graph are partitioned using value partitioning, where each generated partitioned graph represents the target (A) and all of the users whom the user has a relationship with. Alternatively, a subset of the users with whom the target has a relationship may be used, such as the top 50, 100, or other amount of users. The users may be thought of as influencers: users who influencer the target, and whose actions may be of interest to the target user. The relationship depicted in the value graph may be any relationship, such as a follow, a favorite, direct messages, and/or any other action. Any number of value partitioned graphs may be generated. In one or more embodiments, one partitioned graph is generated per user (or per subset of users) of the messaging platform. The partitioned graphs may then be distributed across the shards (or nodes) using a value partition (as described above). In one or more embodiments of the invention, users are distributed across a group of shards (or nodes) according to one or more formulas, such as a hash function. Alternatively, users may be distributed based on alphabetical ordering, numerical ordering, or any other scheme In Step 415, value partitioned graphs are stored across the shards (or nodes) based on the distribution in determined in Step 410. The value partitioned graph may be stored in any manner now known or later developed.

In Step 420, key partitioned graphs are generated by key partitioning the graph (G1) received in Step 400. The key value partition is performed as described above. Further, the result of Step 420 is a set of key partitioned graphs that are distributed across the shards (or nodes) using the same distribution scheme as described with respect to the value partitioned graphs generated in Step 410.

In Step 425, the key partitioned graphs are stored in the appropriate shard (or node) based on the distribution determined in Step 420.

In Step 430, the action graph is stored on all shards (or nodes). As in Steps 415 and 425, the action graph may be stored in any manner now known or later developed, and in any number of shards and/or partitions.

In Step 435, one or more of the following is performed using the broker and one or more of the shards (or nodes): first degree queries, intersection queries, and second degree queries. Examples of the aforementioned queries is described below with reference to FIGS. 5A and 5B. In one embodiment of the invention, the broker receives one or more responses from one or more shards (or nodes) and then returns the response to a requesting processing, where the requesting process may then use the response to take additional action. In one embodiment of the invention, a non-limiting example of processing the results from the nodes is described in steps 440 and 445.

In Step 440, a determination is made whether to send a recommendation to the first target based on the results of Step 435. The determination of whether to send a recommendation may be made based on a variety of factors. In one or more embodiments of the invention, multiple influencers need to perform the same action within a timeframe before a recommendation will be considered for the action. For example, 3, 5, 10, or more users may need to perform the same action. The timeframe may be any suitable amount of time, such as 20 minutes, 3 hours, 7 hours, etc. In addition to multiple influencers performing the same action, additional factors may be considered. These factors may be specific to the target user. For example, a determination may be made if the target user is fatigued—how many recommendations has the target user received recently? Additionally, other factors may be considered such as age, gender, interests, whether the user has performed the action already, last logon, and/or any other suitable factors.

In Step 445, the recommendation is sent to the target. The recommendation may be sent in any form using any method now known or later developed. Depending on the result of Step 440, there may not be a recommendation sent to the target, as indicated by the dotted lines. In one or more embodiments of the invention, the recommendation takes the form of a direct message, e-mail, text message, publically broadcast message, video message, voice message, and/or any other format. The recommendation may be for anything including, but not limited to: a geographical place where influencers presently are, a message to view, an image to view, a user to follow, a profile to view, a message to send, and/or any other actions performable within a messaging platform. It will be apparent to one of ordinary skill in the art that there are many types of actions for which a recommendation may be made and, as such, the invention should not be limited to the above examples.

The following section describes various examples of the invention. The examples are included to aid in the understanding of the invention and are not intended to limit the scope of the invention.

Figure 5A:
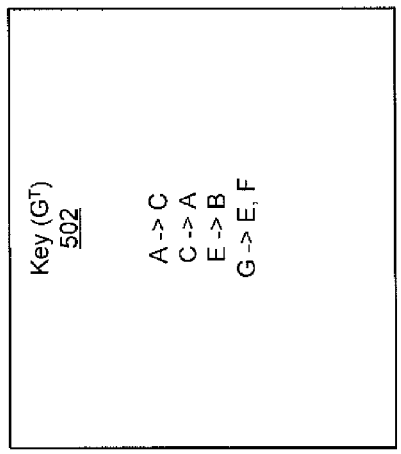
FIGS. 5A-5B show example nodes in accordance with one or more embodiments of the invention.
Figure 5A:
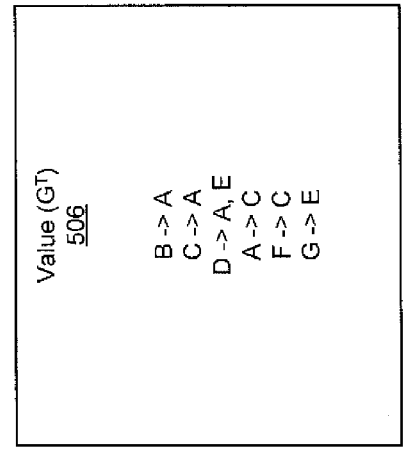
Figure 5A:
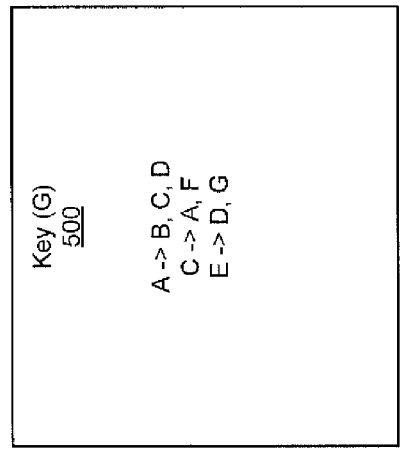
Figure 5A:
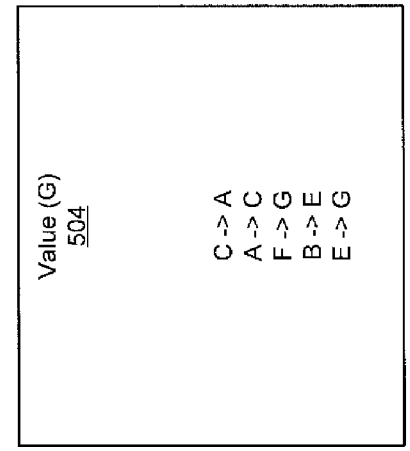
Figure 5B:
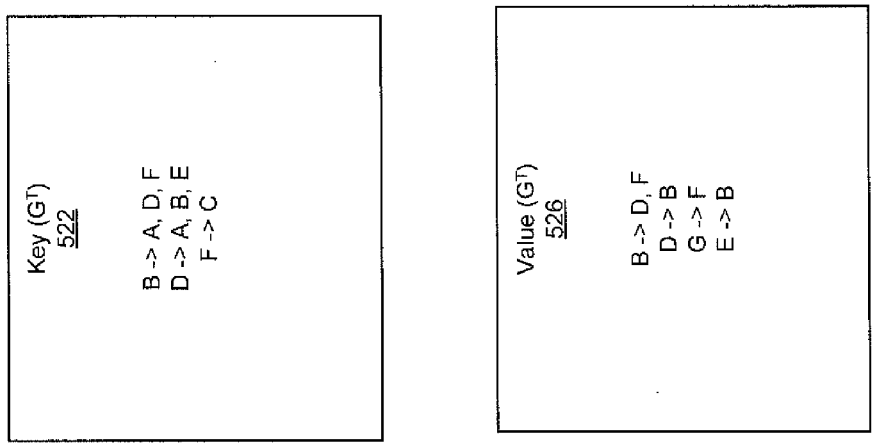
Figure 5B:
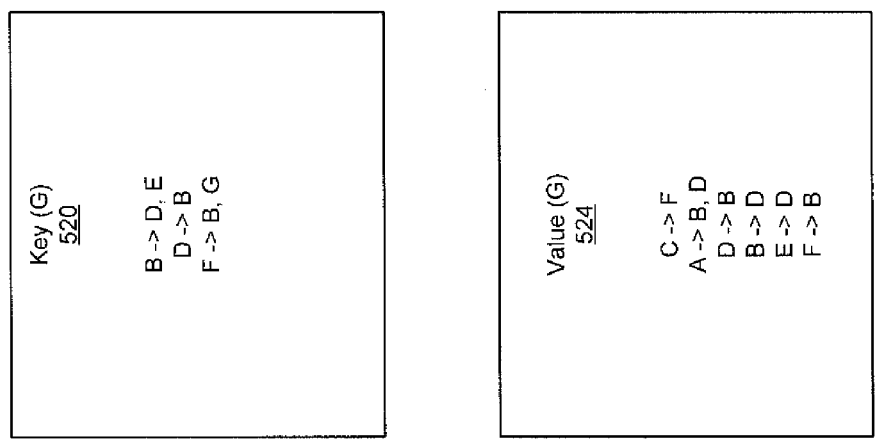

FIGS. 5A and 5B shows an example in accordance with one or more embodiments of the invention. The following discussion describes various queries that may be implemented on the shards (or nodes) in accordance with one or more embodiments of the invention. In this example, the graph is graph (G) (298) in FIG. 2A, where the relationships represent a "follow" relationship. For example, when A follows B, then when B generates broadcasts/multicasts a message on the messaging platform allow followers of B (which includes A) will receive the message. Further, in this example, there are two nodes (which may be executing on the same or different shards). Further, each node includes four partitioned graphs $K(G)$, $K(G^T)$, $V(G)$, $V(G^T)$, where the partitioning for both the key graphs (K) and the value graphs (V) is performed in accordance with the following partitioning scheme (f): A, C, E, G on node 1 and B, D, F on node 2. The partitioned graphs stored on Node 1 are shown in FIG. 5A and the partitioned graphs stored in Node 2 are shown in FIG. 5B. Though not shown in FIGS. 5A and 5B, each of the nodes also includes one or more action graphs (as described above).

As discussed above, the nodes may be used to perform first degree queries, intersection queries, and second degree queries. Other queries may be performed without departing from the invention. Examples for each of the aforementioned query types are included below.

First Degree Query Examples

Example 1

Broker receives request to determine all users followed by user A. In response to the request, the broker applies the partitioning scheme f(A) to determine that the requested information may be determined from node 1. The broker then issues the query to node 1. Node 1 performs a look-up in Key(G) using A as the key and returns: B, C, D.

Example 2

Broker receives request to determine if user A follows user 13. In response to the request, the broker applies the partitioning scheme f(A) to determine that the requested information may be determined from node 1. The broker then issues the query to node 1. Node 1 performs a look-up in Key(G) using A as the key and determines that A follows B, C, and D. Accordingly, node 1 returns a response of true. Node 1 may alternatively perform a look-up in Val $(G^T)$ using B as the key. Alternatively, in response to the request, the broker applies the partitioning scheme f(B) to determine that the requested information may be determined from node 2. The broker then issues the query to node 2. Node 2 performs a look-up in Key($G^T$) using B as the key and determines that B is followed by A, D, and F. Accordingly, node 1 returns a response of true. Node 2 may alternatively perform a look-up in Val (G) using B as the key.

The selection of Node 1 or Node 2 with respect to servicing the query from the broker may be based on load balancing considerations. For example, if Node 1 is currently experiencing a high load then the query may be sent to Node 2.

Example 3

Broker receives request to determine if user A follows users B, D, and E. This request may be broken down into individual queries and be processed using the same process as the described in Example 2. The individual queries may be processed by a single node or the individual queries may be processed by a different nodes. In the former case, the results are determined locally by the node and then a response of true or false may be sent to the broker from the individual node. In the later case, responses to the individual queries are returned to the broker, which then generates the final result based upon the individual received results.

Example 4

Broker receives request to number of users followed by user A. In response to the request, the broker applies the partitioning scheme f(A) to determine that the requested information may be determined from node 1. The broker then issues the query to node 1. Node 1 performs a look-up in Key(G) using A as the key and returns: 3.

In one or more embodiments of the invention, first degree queries may be used to determine one or more of the following: Get the list of followers of a user, Get list of followings of a user (i.e., who is the user following), get list of items bought by a user (where G relates users to items purchased), list of tweets favorited by a user (where G relates users to tweets favorite), does user A follow user B; is user B followed by user A, do A and B follow each other: (mutual follow graph), did user A buy item I (where G relates users to items purchased), has user A retweeted tweet T (where G relates users to retweets), how many users follow A; how many tweets has A favorite (where G relates users to favorite tweets), how many movies has A watched (where G relates users to movies watched), how many mutual follows does A have (i.e., followers of A that A follows), how many items has A bought (where G relates users to items bought)

Intersection Query Examples

Example 4

Broker receives request to determine all common out-edges between users A and D, i.e., which users are followed by both user A and user D. In response to the request, the broker issues a query to all nodes the in the system, each node then does the following: (i) look-up Val(G) with key A, (ii) look-up Val(G) with key D and (iii) intersect the results. In this example, Node 1 performs a look-up in Val (G) with key A which returns C, and performs a look-up in Val (G) with key D which returns { }. Accordingly, the intersection is { }. Similarly, node 2 performs a look-up in Val (G) with key A returns B, D and a performs a look-up in Val (G) with key D returns B. Accordingly, the intersection is B. The individual results are returned back to the broker, which then does a union of the individual results and returns them to the requesting processing. In this example, the final result is B, which means that A and D both follow B. (see also, FIG. 2A).

In another embodiment of the invention, if the set of users following A is small, the broker may send a first query to node 1 (determined using f(A)) to obtain the set of users that A follows. The broker may then send these results to node 2 (determined using f(A)) to do an intersection between users follows A (obtained node 1) and users following D determined using one or more partitioned graphs on node 2. Node 2 subsequently sends a response back to the broker. As compared with the approach of the prior example, this embodiment limits the number of nodes that need to process any portion of the query from the broker.

Example 5

Broker receives request to determine all users $B_i$ that satisfies the following $A \rightarrow B_i$ and $B_i \rightarrow D$. In response to the request, the broker issues a query to all nodes the in the system, each node then does the following: (i) look-up Val(G) with key A, (ii) look-up Val($G^T$) with key D and (iii) intersect the results. In this example, Node 1 performs a look-up in Val (G) with key A which returns C, and performs a look-up in Val ($G^T$) with key D which returns { }. Accordingly, the intersection is { }. Similarly, node 2 performs a look-up in Val (G) with key A which returns B, D, and performs a look-up in Val ($G^T$) with key D which returns B. Accordingly, the intersection is B. The individual results are returned back to the broker, which then does a union of the individual results and returns them to the requesting process. In this example, the final result is B, which means that A follows B and B follows D. (see FIG. 2A).

Example 6

Broker receives request to determine all users $B_i$ that satisfies the following $B_i \rightarrow B$ and $B_i \rightarrow D$. In response to the request, the broker issues a query to all nodes the in the system, each node then does the following: (i) look-up Key($G^T$) with key B, (ii) look-up Key($G^T$) with key D and (iii) intersect the results. In this example, Node 1 performs a look-up in Key($G^T$) with key B returns { } and a performs a look-up in Key ($G^T$) with key D returns { }. Accordingly, the intersection is { }. Similarly, node 2 performs a look-up in Key($G^T$) with key A returns {A, D, F} and a performs a look-up in Key ($G^T$) with key D returns {A, B, E}. Accordingly, the intersection is A. The individual results are returned back to the broker, which then does a union of the individual results and returns them to the requesting processing. In this example, the final result is A, which means that A follows B and A follows D. (see FIG. 2A).

Random Walk Examples

Random walk examples may be first degree queries or second degree queries depending on the particulars of the random walk request.

Example 7

Broker receives request to randomly select a follower of user A. This request may be performed in the same manner as Example 1 using Node 1 (determined using AA)) using Key (G) with key A. Node 1 may then randomly select one of the users identified from the look-up and then return this user's identity to the broker. Alternatively, the broker may randomly select the user from the set of users identified from the aforementioned lookup.

Example 8

Broker receives request to randomly select K $2^{nd}$ degree followers of user A. The broker determines the number of followers (n) of A in the manner described in Example 4. The broker then sends a query to each of the nodes along with the value n. Each node then performs the following steps: (i) for user ($B_i$) returned in the look-up Val(G) with key A, take (floor (k/n)+R) random samples form Key (G) with key $B_i$, where R is 1 with a probability of p, where p=(k/d−floor(k/d)). The individual results are then merged by the broker to generate the randomly chosen K $2^{nd}$ degree followers. In one embodiment of the invention, because the selection of K random $2^{nd}$ degree followers performed in a distributed manner, each of the nodes is individually working to obtain a subset of K users. There is no need for inter-node communication. More specifically, because of the manner in which G is key and value partitioned, a node may locally follow two edges from user A. In contrast, graphs that are partitioned only using key or value partitioning, will require at a minimum two passes with intermediate results—the first pass to determine all first degree edges from A and a second pass that broadcasts this information to all nodes the system in order to determine the K second degree user.

Second Degree Queries

Example 9

Broker receives request to determine whether D is within a second degree of A. This request may be reduced to whether there is a $B_i$ that satisfies the following A→$B_i$ and $B_i$→D. Accordingly, this request may be processed in accordance with Example 5 discussed above.

Example 10

Broker receives request to determine all users that are 2 degrees from A. The broker issues a request to each node. Each node subsequently does the following: (i) look-up Val(G) with key A to determine $\{B_i\}$, (ii) look-up Key(G) with key $\{B_i\}$, and (iii) generate union of results from (ii) the results. The broker then performs a union on all results received from the nodes. In this example, Node 1 performs a look-up in Val(G) with key A which returns {C}, and performs a look-up in Key (G) with key C which returns {A, F}. Similarly, node 2 performs a look-up in Val (G) with key A which returns {B, D}, and performs a look-up in Key (G) with key B which returns {D, E}, and performs a look-up in Key (G) with key D which returns {B}. Accordingly, the union of (ii) is {B, D, E}. The individual results are returned back to the broker, which then does a union of the individual results and returns them to the requesting process. In this example, the final result is A, B, D, E, F. (see FIG. 2A).

Example 11

The broker receives a request to determine the top K nodes that are within a second degree of A, where K is determined based on the number of in-edges. The broker sends a request to each node. Each node then does a local union of Key (G)($B_i$), where $B_i$ is determined using Val (G) with key A. Each node then sends the top K user, along with count of connecting users with each of the top K user. The broker then merge these sorted lists (one sorted list of nodes from each node) to get the top K user.

Collaborative Filtering Queries

Example 12

The broker receives a request to obtain the cosine similarity of the in-edges of A and B. In response to this request, can be sent just to the nodes that are used to determine (i) the number of in-edges of A, (ii) number of in-edges of B, and (iii) the intersection of in-edges of A and B. Accordingly, this request may determined by at most using two nodes (determined using f(A), f(B)). However, this request may be serviced by a single node if all the information exists on the single node.

With respect to servicing the request, the method shown in Example 6 may be used to obtained the aforementioned information (i)-(iii). This information may then be used to determine the Cosine similarity as follows: Cosine(A_B_in) =(In(A)∩In(B))/sqrt(size(in(A)·size(in(B))). Said another way, the Cosine similarity is determined using the size of the intersection of the in-edges of A and B, divided by a normalization factor that involves the total number of in-edges of A and of B. The size of the intersection is obtained as explained above in example 6, while the normalization factor can be obtained by the nodes to which A and B have been assigned.

Example 13

The broker receives a request to get the top K users (measured by cosine score) similar to A. For example, this query can be used to get "Users who follow A also follow <the users most similar to A>". When the set returned from the look-up Key($G^T$) with key A is large, then the following steps may be performed by each node. For each $B_i$ from Val ($G^T$) with key A, look up key(G) with key $B_i$ to obtain set of $C_i$, and then do a local union of $C_i$. Then the broker normalizes the Cosine similarity calculation using sqrt(in-degree (C)), wherein in-degree (C) is proportional to the local in-degree (C). This assumption may be made as the $B_i$ have been uniformly and independently distributed across the nodes. The cosine similarity calculation may be in accordance with Example 12.

In an another embodiment of the invention, the request in Example 13 may be serviced using a two iteration version. First, the broker retrieves {Bi} using the look-up from Key ($G^T$) with key A from node 1 (as determined using f(A)). The broker then send the {Bi} to all nodes. Each nodes does a union of individual results from look-ups of Val (G) with keys $\{B_i\}$ to obtain $\{C_i\}$. Each node then calculates a cosine similarity for all {Ci}, where normalization that is required in the cosine similarity calculation can be determined using data on the node that is calculating the cosine similarity for $\{C_i\}$ as the node can do a look-up for Key($G^T$) for each $\{C_i\}$. The node then calculates the top local $C_i$ and then sends this information to the broker. The broker calculates the global top K $C_i$ and returns the response.

In one or more embodiments of the invention second degree queries can be used to generate recommendations, e.g., movies watched by people you follow, items purchased by your friends, photos liked by people in your contacts graph. etc. In addition, the similar calculations between two users may be used in recommendations or machine learning algorithms can use these as features.

Recommendations Example

Consider an example for generating recommendations. Using the graph shown in FIG. 2A and the distribution of partitioned graphs in FIGS. 5A and 5B. Consider a scenario in which user B performed action X within this last 24, where this information is included in an action graph: X←[B, C]. The action graph is distributed to each node, see FIG. 3. In order to determine whether to issue a recommendation for a given user, that user must be following at least two users that performed the action X within the last 24 hours.

Node 1 receives a query from the broker and performs the following actions: (i) look-up Val($G^T$) with key B to obtain {A}; (ii) look-up Key(G) with key A to obtain {B, C, D}, (iii) intersect {B, C, D} with the action graph to obtain {B, C}, which indicates that two user's that A follows (i.e., user B and user C) have performed action X in the last 24 hours. The results are then forwarded to the broker.

Node 2 receives a query from the broker and performs the following actions: (i) look-up Val($G^T$) with key B to obtain {D, F}; (ii) look-up Key(G) with key D to obtain {B} and with key F to obtain {B, G}, (iii) intersect {B} with the action graph to obtain {B}, which indicates that D follows user B and that user B has performed action X in the last 24 hours, and intersect {B, G} with the action graph to obtain {B}, which indicates that user F follows user B and that user B has performed action X in the last 24 hours. The results are then forwarded to the broker.

The broker determines that user A should get a recommendation based on action X being performed in the last 24 hours by at least two users that user A follows. However, users D and F should not receive recommendations as they are not following at least two users that performed action X in the last 24 hours. The use of the aforementioned graphs to determine whether to recommend something to a user enables such recommendations to be performed in real-time, near real-time, or within a time period that results in the recommendation still being relevant to the user that received the recommendation.

The partitioning of the graphs in accordance with one or more embodiments of the invention allows for the various users that need recommendations to be determined locally the node without the need for inter-node communication.

Load Balancing

In one embodiment of the each a given edge (e.g., A→B) in graph G is stored in four different partitioned graphs in the set of nodes: two copies are stored in node 1 (as determined using f(A)) once in Key (G) under key A and once in Val ($G^T$) under key A and two copies are stored in node 2 (as determined using f(B)) once in Key($G^T$) under key A and once in Val (G) under key A. This redundancy allows for efficient 2-degree graph operations as mentioned above. This redundancy can be used for load balancing see e.g., Example 2 above.

In one embodiment of the invention, the arrangement of the key partitioned and value partitioned data structures do not have to be identical in the nodes. They may be separately arranged on the basis of operations best suited to them. For example, if the value graph partitions are primarily being used for efficient intersections, the adjacency lists in this data structure may be stored, e.g., in descending numeric order of user ids (where user's are nodes in the graph). Further, if the key partitioned graph is being primarily used for getting top k users in the adjacency list (by some associated data such as a score or timestamp), the key partitioned graph may be organized in descending order of these scores.

Figure 6:
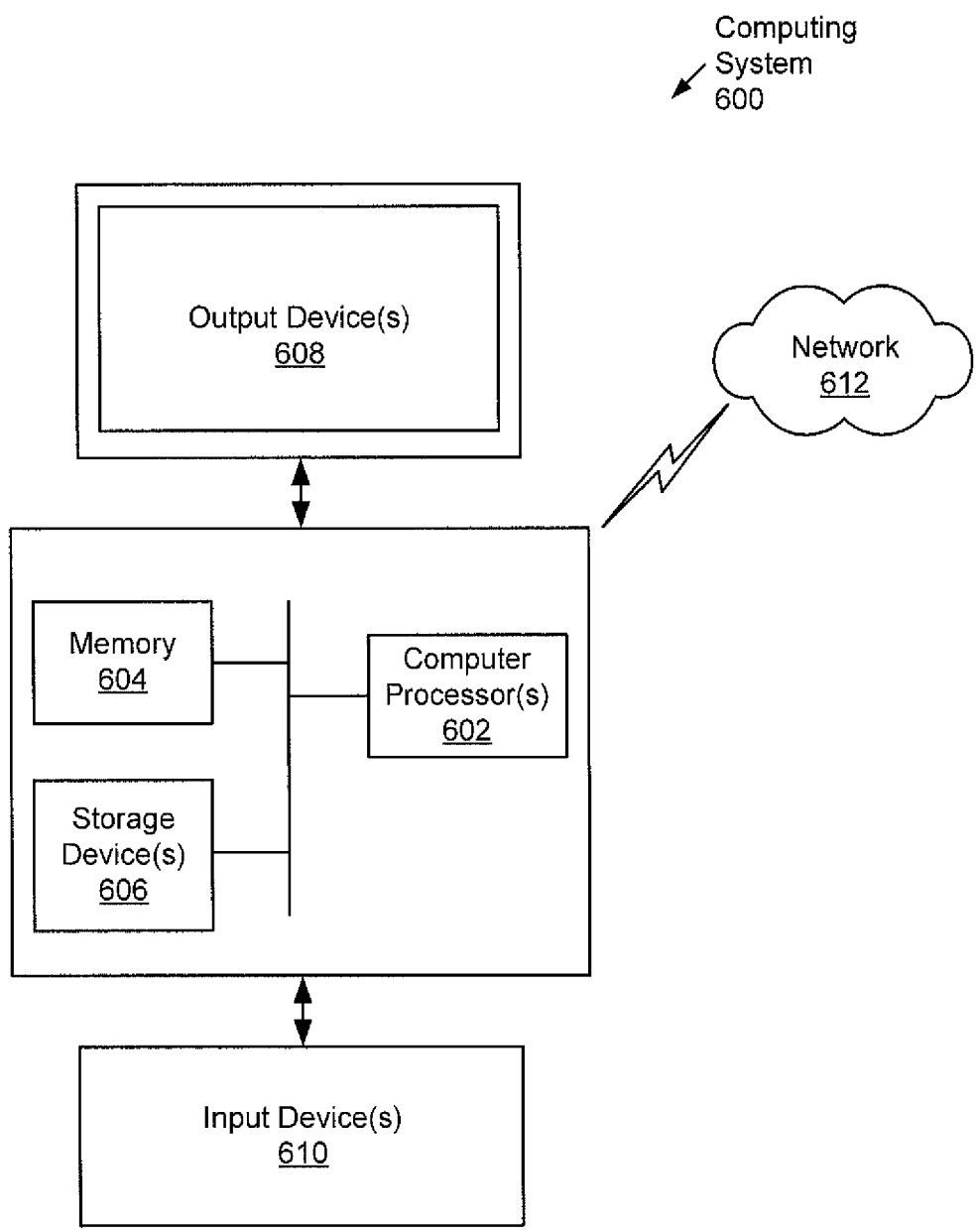
FIG. 6 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments can be devised which do not depart from the scope of the invention as disclosed herein.

What is claimed is:

1. A method for distributed processing, comprising:
receiving a first graph (G) comprising a plurality of targets and a plurality of influencers, wherein each of the plurality of influencers is related to at least one of the plurality of targets, and wherein each of the plurality of influencers and the plurality of targets corresponds to a respective account of a messaging system, and wherein the first graph indicates accounts as nodes and relationships between the accounts as edges connecting one or more nodes;
key partitioning G across a first physical shard and a second physical shard;
transposing the first graph (G) to obtain a first transposed graph ($G^T$), wherein the first transposed graph $G^T$ transposes the relationships between the nodes of G;
value partitioning $G^T$ across the first physical shard and the second physical shard;
in response to an action associated with a first account of the messaging system, issuing, to the first physical shard, a first request to perform a first intersection using G and $G^T$, wherein the first request specifies an influencer of the plurality of influencers corresponding to the first account;
receiving a first response to the first request, wherein the first response comprises a set of influencers each of which is related to a first target of the plurality of targets, and wherein the set of influencers is calculated based at least on a portion of data resulting from the key partitioning and the value partitioning;
determining whether to send a recommendation to the second account of the messaging system corresponding to the first target based on the first response; and
in response to a determination to send the recommendation, sending the recommendation to the second account.

2. The method of claim 1, further comprising:
issuing, to the second physical shard, a second request to perform a second intersection, wherein the second request specifies the influencer;
receiving in a second response to the second intersection, wherein the second response comprises a second set of influencers each of which is related to the first target; and
wherein determining whether to send the recommendation to the first target is further based on the second response.

3. The method of claim 1, wherein the key partitioning of G results in at least a first key partitioned graph (K(G1)) on the first shard and a second key partitioned graph (K(G2)) on the second shard, and wherein the value partitioning of $G^T$ results in at least a first value partitioned graph (V(G1$^T$)) on the first physical shard and a second value partitioned graph (V(G2$^T$)) on the second physical shard.

4. The method of claim 3, further comprising:
value partitioning G across the first physical shard and the second physical shard, wherein the value partitioning of G results in at least a third value partitioned graph (V(G1)) on the first physical shard and a fourth value partitioned graph (V(G2)) on the second physical shard;
key partitioning $G^T$ across the first physical shard and the second physical shard plurality of physical shards, wherein the key partitioning of $G^T$ results in at least a third key partitioned graph (K(G1$^t$)) on the first physical shard and a fourth key partitioned graph (K(G2$^T$)) on the second physical shard;
issuing a second request to the first physical shard, where the request requires the first physical shard to use at least one selected from a group consisting of K(G1), V(G1) and K(G1$^T$), and V(G1$^T$); and
receiving a second response to the second request.

5. The method of claim 4, wherein the second request is one selected from a group consisting of a first degree query, a second degree query, an intersection query, and a collaborative filtering query.

6. The method of claim 4, further comprising:
selecting the first physical shard to perform the second request, wherein the second request specifies a member in G and the first physical shard is selected by applying a hash function using the member as an input to the hash function, wherein the member is one selected from a group consisting of a target in G and an influencer in G.

7. The method of claim 4, further comprising:
issuing a third request to the second physical shard, wherein the third request requires the second physical shard to use one selected from a group consisting of K(G2), V(G2) and K(G2), and V(G2$^T$); and
receiving a third response to the third request.

8. The method of claim 7, further comprising:
generating a final response using the second response and the third response.

9. The method of claim 3, further comprising:
receiving an action graph comprising a plurality of actions performed by one or more of the plurality of influencers;
issuing, to the first physical shard, a second request to perform a second intersection, wherein the second request specifies a second influencer;
performing, using the second influencer as a key, a look-up in V(G1$^T$) to obtain a first set of targets;
performing, using a first target in the set of targets as a key, a look-up in K(G1) to obtain a first set of influencers for the first target;
performing the second intersection between the first set of influencers and the action graph to obtain a second set of influencers;
providing a response to the second request comprising the second set of influencers.

10. The method of claim 9, wherein the plurality of actions were performed within a time frame.

11. The method of claim 9, wherein the second set of influencers are related to the first target based on a follow.

12. The method of claim 9, wherein G1 comprises a plurality of targets and a plurality of influencers, wherein each of the plurality of influencers is related to at least one of the plurality of targets, wherein $V(G1^T)$ is derived from G1.

13. The method of claim 9, wherein G1 comprises a plurality of targets and a plurality of influencers, wherein each of the plurality of influencers is related to at least one of the plurality of targets, wherein $K(G1)$ is derived from G1.

14. The method of claim 9, wherein the action graph comprises a plurality of actions performed by one or more of the plurality of influencers.

15. The method of claim 14, wherein the plurality of actions comprise one or more of: a follow, viewing a profile, retweeting, sending a direct message, sending a tweet, and favoriting.

16. The method of claim 1, wherein key partitioning G across the first physical shard and the second physical shard comprises using a hash function and wherein valuing partitioning Gr across the first physical shard and the second physical shard comprises using the hash function.

17. The method of claim 1, wherein the plurality of influences are related to one or more of the plurality of targets based on a follow.

18. The method of claim 1, wherein the recommendation is sent to the first target when the size of the set of influencers is greater than 2.

19. The method of claim 1, wherein the first physical shard is partitioned in to a plurality of nodes, and wherein the $K(G1)$ and $V(G1^T)$ are located on a node of the plurality of nodes on the first physical shard.

20. The method of claim 1, wherein a number of influencers of the plurality of influencers for any target in $K(G1)$ is ≤200.

21. The method of claim 1, wherein the first response to the first request is generated based on:
  look-up a first key associated with the influencer associated with the event in the value partition of $G^T$ on the first physical shard;
  look-up a second key corresponding to the result of the look-up of $G^T$ on the first physical shard key partition G; and
  intersecting the look-up result of the second key with an action graph comprising a plurality of actions performed by one or more of the plurality of influences to identify the set of influences.

22. The method of claim 21, wherein the set of influencers indicate user accounts that are followed by the first target and have performed the action, and wherein the result of the look-up of $G^T$ indicates the first target.

23. A system, comprising:
a first physical shard;
a second physical shard; and
a cross partitioning engine including functionality to:
  receive a first graph (G) comprising a plurality of targets and a plurality of influences, wherein each of the plurality of influences is related to at least one of the plurality of targets, and wherein each of the plurality of influences and the plurality of targets corresponds to a respective account of a messaging system, and wherein the first graph indicates accounts as nodes and relationships between the accounts as edges connecting one or more nodes;
  key partition G across the first physical shard and the second physical shard;
  transpose the first graph (G) to obtain a first transposed graph ($G^T$), wherein the first transposed graph $G^T$ transposes the relationships between the nodes of G;
  value partition $G^T$ across the first physical shard and the second physical shard;
  in response to an action associated with a first account of the messaging system, issue, to the first physical shard, a first request to perform a first intersection using G and $G^T$, wherein the first request specifies an influencer of the plurality of influences corresponding to the first account;
  receive a first response to the first request, wherein the first response comprises a set of influences each of which is related to a first target;
  determine whether to send a recommendation to the second account of the messaging system corresponding to the first target based on the first response; and
  in response to a determination to send the recommendation, sending the recommendation to the second account.

24. A non-transitory computer readable medium comprising computer readable program code, which when executed by a computer processor enables the computer processor to:
  receive a first graph (G) comprising a plurality of targets and a plurality of influences, wherein each of the plurality of influences is related to at least one of the plurality of targets, and wherein each of the plurality of influences and the plurality of targets corresponds to a respective account of a messaging system, and wherein the first graph indicates accounts as nodes and relationships between the accounts as edges connecting one or more nodes; key partition G across a first physical shard and a second physical shard;
  transpose the first graph (G) to obtain a first transposed graph ($G^T$), wherein the first transposed graph $G^T$ transposes the relationships between the nodes of G; value partition $G^T$ across the first physical shard and the second physical shard;
  in response to an action associated with a first account of the messaging system, issue, to the first physical shard, a first request to perform a first request using G and $G^T$, wherein the first request specifies an influencer of the plurality of influences corresponding to the first account;
  receive a first response to the first request, wherein the first response comprises a set of influences each of which is related to a first target;
  determine whether to send a recommendation to the second account of the messaging system corresponding to the first target based on the first response; and
  in response to a determination to send the recommendation, sending the recommendation to the second account.

\* \* \* \* \*

UNITED STATES PATENT AND TRADEMARK OFFICE
CERTIFICATE OF CORRECTION

PATENT NO. : 9,858,130 B2
APPLICATION NO. : 14/498787
DATED : January 2, 2018
INVENTOR(S) : Ajeet Grewal et al.

It is certified that error appears in the above-identified patent and that said Letters Patent is hereby corrected as shown below:

On the Title Page

Item (57), In Abstract, Line 7, delete "valuing" and insert -- value -- therefor.

In the Specification

At Column 1, Line 53, delete "valuing" and insert -- value -- therefor.

At Column 1, Line 54, delete "GT" and insert -- $G^T$ -- therefor.

At Column 2, Line 11, delete "valuing partition" and insert -- value partitioning -- therefor.

At Column 2, Line 12, delete "GT" and insert -- $G^T$ -- therefor.

At Column 2, Line 38, delete "valuing partition" and insert -- value partitioning -- therefor.

At Column 8, Line 45, delete "valuing" and insert -- value -- therefor.

At Column 14, Line 29, delete "user 13" and insert -- user B -- therefor.

In the Claims

At Column 22, Line 16, in Claim 4, delete "plurality of physical shards".

At Column 22, Line 18, in Claim 4, delete "(K(G1$^t$))" and insert -- (K(G1$^T$)) -- therefor.

At Column 22, Line 22, in Claim 4, delete "the request" and insert -- the second request -- therefor.

At Column 22, Line 42, in Claim 7, delete "and K(G2)," and insert -- and K(G2$^T$), -- therefor.

Signed and Sealed this
Twelfth Day of February, 2019

Andrei Iancu
*Director of the United States Patent and Trademark Office*

CERTIFICATE OF CORRECTION (continued)
U.S. Pat. No. 9,858,130 B2

At Column 22, Line 56, in Claim 9, delete "the set" and insert -- the first set -- therefor.

At Column 23, Line 20, in Claim 16, delete "valuing" and insert -- value -- therefor.

At Column 23, Line 21, in Claim 16, delete "Gr" and insert -- $G^T$ -- therefor.

At Column 23, Line 24, in Claim 17, delete "influences" and insert -- influencers -- therefor.

At Column 23, Line 46, in Claim 21, delete "influences" and insert -- influencers -- therefor.

At Column 23, Line 47, in Claim 21, delete "influences." and insert -- influencers. -- therefor.

At Column 23, Line 57, in Claim 23, delete "influences," and insert -- influencers, -- therefor.

At Column 23, Line 58, in Claim 23, delete "influences" and insert -- influencers -- therefor.

At Column 23, Line 60, in Claim 23, delete "influences" and insert -- influencers -- therefor.

At Column 24, Line 16, in Claim 23, delete "influences" and insert -- influencers -- therefor.

At Column 24, Line 19, in Claim 23, delete "influences" and insert -- influencers -- therefor.

At Column 24, Line 31, in Claim 24, delete "influences," and insert -- influencers, -- therefor.

At Column 24, Line 32, in Claim 24, delete "influences" and insert -- influencers -- therefor.

At Column 24, Line 34, in Claim 24, delete "influences" and insert -- influencers -- therefor.

At Column 24, Line 49, in Claim 24, delete "influences" and insert -- influencers -- therefor.

At Column 24, Line 31, in Claim 52, delete "influences" and insert -- influencers -- therefor.